United States Patent
Rickis et al.

(10) Patent No.: US 9,644,762 B2
(45) Date of Patent: May 9, 2017

(54) APERTURE PLATES FOR PRESSURE-REGULATING VALVES

(71) Applicant: Hamilton Sundstrand Corporation, Charlotte, NC (US)

(72) Inventors: Aaron F. Rickis, Feeding Hills, MA (US); Francis P. Marocchini, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 17 days.

(21) Appl. No.: 14/601,605

(22) Filed: Jan. 21, 2015

(65) Prior Publication Data

US 2016/0208932 A1    Jul. 21, 2016

(51) Int. Cl.
*B01D 35/153* (2006.01)
*F16K 47/14* (2006.01)
*F16K 15/02* (2006.01)
*F16K 17/04* (2006.01)
*B01D 35/157* (2006.01)

(52) U.S. Cl.
CPC ............ *F16K 47/14* (2013.01); *F16K 15/025* (2013.01); *F16K 17/046* (2013.01); *B01D 35/153* (2013.01); *B01D 35/157* (2013.01); *B01D 35/1573* (2013.01); *B01D 35/1576* (2013.01)

(58) Field of Classification Search
CPC  B01D 35/153; B01D 35/157; B01D 35/1573; B01D 35/1576

USPC .................. 137/535, 538, 544, 550; 210/136
See application file for complete search history.

(56) References Cited

U.S. PATENT DOCUMENTS

| 5,843,284 | A | * | 12/1998 | Waters | B01D 27/02 196/115 |
| 6,105,609 | A | * | 8/2000 | Polidan | F16K 15/141 137/515.7 |
| 6,187,182 | B1 | * | 2/2001 | Reynolds | B01D 46/0004 137/541 |
| 6,997,208 | B2 | * | 2/2006 | Mack | B01D 29/114 123/196 R |
| 2008/0078712 | A1 | * | 4/2008 | Enokida | B01D 29/111 210/167.02 |
| 2011/0219528 | A1 | * | 9/2011 | Cadavid | E03C 1/281 4/301 |
| 2012/0227839 | A1 | * | 9/2012 | Veit | F16K 15/025 137/538 |
| 2013/0153063 | A1 | * | 6/2013 | Sayre | F16L 5/12 137/561 R |

* cited by examiner

*Primary Examiner* — Michael R Reid
*Assistant Examiner* — Paul J Gray
(74) *Attorney, Agent, or Firm* — Locke Lord LLP; Scott D. Wojsy; Christopher J. Cillié

(57) ABSTRACT

A valve assembly includes a sleeve with an inlet and an outlet. A spool is slideably disposed within an interior of the sleeve and is movable along a spool movement axis defined by the sleeve between first and second positions such a flow area between the inlet and outlet is greater when the spool is in the second position than when the spool is in the first position. An aperture plate seats within the sleeve inlet and is axially adjacent to the spool. The aperture plate defines a core flow and a flow-directing aperture to center and straighten a fluid flow entering the sleeve inlet.

14 Claims, 3 Drawing Sheets

APERTURE PLATES FOR PRESSURE-REGULATING VALVES

BACKGROUND OF THE INVENTION

1. Field of the Invention

The present disclosure relates to fluid systems, and more particularly to valves for fluid distribution systems.

2. Description of Related Art

Fluids traversing fluid systems can sometimes include entrained material, such as debris, particulate, or contaminate. As the fluid moves through the fluid system entrained material can accumulate within system elements, potentially affecting operation of the system. For example, fluid systems commonly include valves with valve bodies and movable valve members. The valve body generally couples to the fluid system such that fluid provided to the valve flows through an interior of the valve body. The valve member typically seats in the valve body interior within the fluid flow, and movement of the valve member changes (e.g. throttles) fluid flow through the valve. This allows for control of fluid flow through the valve to different parts of the fluid system and changing flow parameters like mass flow rate and pressure.

In some types of valves, for example check valves and pressure-regulating valves, entrained material within fluid provided to the valve can accumulate within the valve body. Accumulated material can influence movement of the valve member within the valve body, potentially changing valve operation. Some fluid systems include filters for removing entrained material from fluid flows provided to the valve and other fluid system elements.

Such fluid systems and methods have generally been considered satisfactory for their intended purpose. However, there is still a need in the art for improved valves. The present disclosure provides a solution for this need.

SUMMARY OF THE INVENTION

A valve assembly includes a sleeve defining an inlet and an outlet. A spool within an interior of the sleeve is movable between a first position and a second position. In the first position the spool occludes the outlet and restricts fluid communication between the inlet and outlet. In the second position, the spool allows fluid communication between the inlet and the outlet. An aperture plate seats within the sleeve inlet axially adjacent to the spool. The aperture plate defines a core flow aperture and a flow-directing aperture. The core flow aperture and the flow-directing aperture cooperate to linearize flow between the aperture plate and a face of the spool.

In certain embodiments, the spool is movable between the first and second positions along a movement axis defined by the sleeve. The aperture plate can be angle relative to the movement axis, such as at a 90-degree angle or any other suitable angle, and the movement axis can extend through core flow aperture. The face of the spool can be angled relative to the movement axis, such as at a 90-degree angle or other suitable angle, and can define a cupped profile. The cupped profile can be offset axially relative to the aperture plate by a separation distance, and the separation distance can be greater in the spool second position than in the spool first position.

The core flow aperture can extend axially through a thickness of the aperture plate along the movement axis defined by the sleeve. The core flow aperture can taper axially between upstream and downstream faces of the aperture plate. An upstream face of the aperture plate can define a first flow area, a downstream face of the aperture plate can define a second flow area, and the first flow area can be greater than the second flow area such that the core flow aperture tapers between the upstream and downstream faces of the aperture plate.

In accordance with certain embodiments the flow-directing aperture can define a uniform flow area extending through the thickness of the aperture plate. The flow-directing aperture can be angled with respect to the spool movement axis, and an axis defined by the flow-directing axis can intersect the core flow axis at a location between the aperture plate and the spool. The angle of the flow-directing aperture axis can be a 45-degree angle or other suitable angle. It is also contemplated that the aperture plate can define a plurality of flow-directing apertures. The plurality of flow-directing apertures can be arranged circumferentially about the core flow aperture. The flow-directing apertures can be offset from the movement axis by a radial offset, and can also be circumferentially offset from one another by a shared pitch. Axes defined by flow-directing apertures disposed on opposite sides of core flow aperture can be coplanar with the movement axis of the spool.

It is also contemplated that in certain embodiments a periphery of the aperture plate can define an anti-rotation feature. The anti-rotation feature can be a linear segment of the aperture plate periphery, and can seat against a corresponding flat surface defined within an interior of the sleeve. The linear periphery segment can be bounded by one or more arcuate periphery segments, and a second linear segment can be defined by the periphery on a side of the aperture plate opposite the first linear segment. First and second arcuate segments can span the linear segments on opposite sides of the aperture plate periphery.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
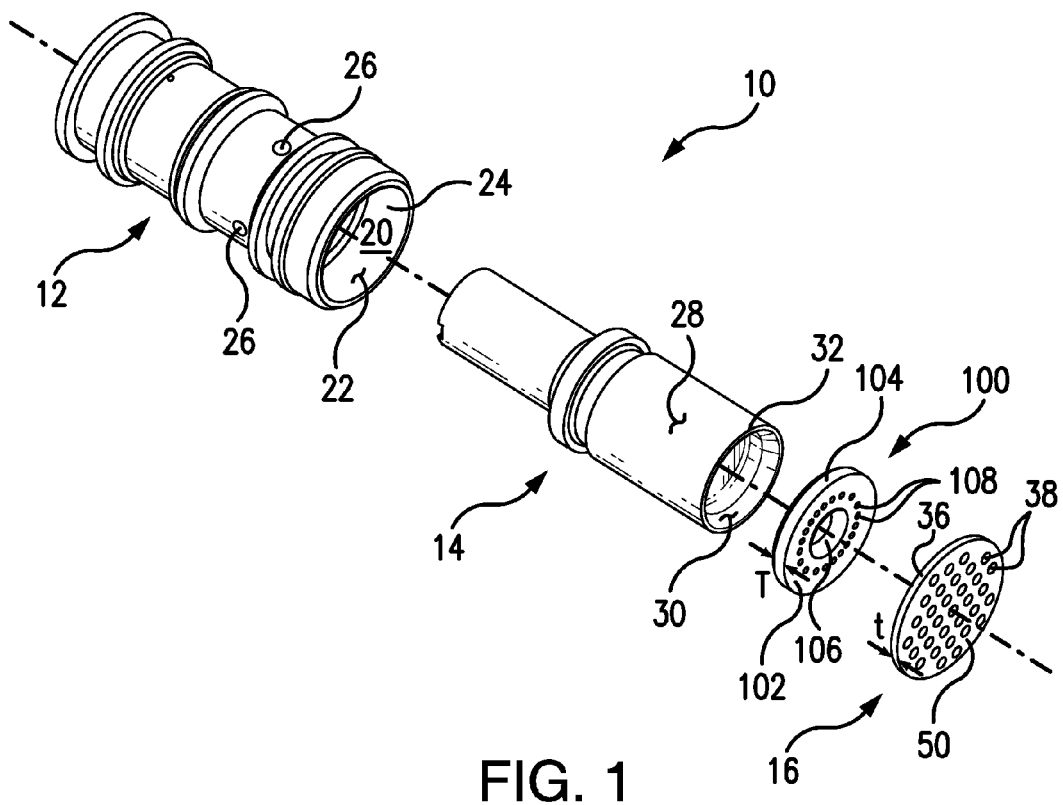
FIG. 1 is an exploded perspective view of an exemplary embodiment of a valve assembly, showing a sleeve, a spool, and an aperture plate.

Reference will now be made to the drawings wherein like reference numerals identify similar structural features or aspects of the subject disclosure. For purposes of explanation and illustration, and not limitation, a partial view of an exemplary embodiment of a valve assembly in accordance with the disclosure is shown in FIG. 1 and is designated generally by reference character 10. Other embodiments of valves and valve assemblies in accordance with the disclosure, or aspects thereof, are provided in FIGS. 2-6, as will be described. The systems and methods described herein can be used fluid distribution systems, such as in fuel systems for aircraft main engines and/or auxiliary power units.

Valve assembly 10 includes a sleeve 12, a spool 14, an aperture plate 100, and a screen 16. Sleeve 12 defines a spool movement axis M that extends through an interior 20 of sleeve 12. Interior 20 is bounded by an interior surface 22 of sleeve 12 that extends circumferentially about spool movement axis M. An inlet 24 is defined on an end of sleeve 12 what extends circumferentially about movement axis M. A plurality of outlets 26 extend through sleeve 12 from interior surface 22 to the environment external to valve assembly 10. Outlets 26 defines respective flow areas that are angled with respect to a flow area defined by inlet 24, and are distributed circumferentially sleeve 12 relative to spool movement axis M.

Spool 14 is slideably received within sleeve interior 20 along spool movement axis M. Spool 14 has a radial surface 28, an inlet face 30, and a lip 32. Radial surface 28 extends circumferentially about spool movement axis M and closely conforms to interior surface 22 of sleeve 12. In this respect spool 14 is mechanically matched to sleeve 12 dimensionally such that radial surface 28 slideably and sealably engages interior surface 22 of sleeve 12. This enables spool 14 to occlude a flow area defined between inlet 24 and outlet 26 when spool 14 moves along spool movement axis M between first and second spool positions (shown in FIG. 2).

Lip 32 extends circumferentially about spool movement axis M at the interface of radial surface 28 and inlet face 30. As will be appreciated, displacement of spool 14 can position lip 32 radially inward of outlet 26 and allow for scheduled fluid communication between inlet 20 and outlet 26. The scheduling is such that substantially no communication occurs between inlet 20 and outlet 26 is first position wherein inlet face 30 is proximate aperture plate 100, a maximum amount of fluid communication occurs in a second position wherein inlet face is displaced distally from aperture plate 100, and a variable flow area exists between inlet 20 and outlet 26 therebetween as a function of axial position of spool 14 along spool movement axis M.

Screen 16 is optional, and includes a screen body 50. Screen body 50 defines a peripheral edge 36 and a plurality of screen apertures 38. Peripheral edge 36 extends circumferentially about spool movement axis M and is registered to a periphery 104 of aperture plate 100. Screen apertures 38 extend through a thickness t of screen body 50, define flow axes that are substantially parallel with spool movement axis M, and may be relatively small relative to particulate entrained within fluid traversing the screen. This can prevent large particulate from obstructing fluid passageways downstream of screen 16. Screen body thickness t may be less than aperture plate thickness T.

Figure 2:
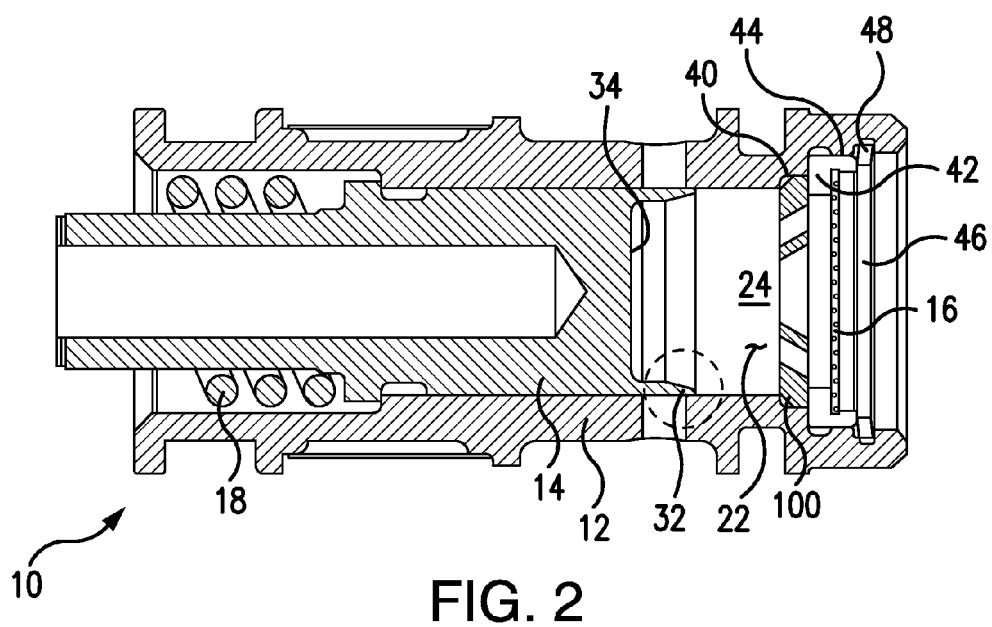
FIG. 2 is a cross-sectional side elevation view of the valve assembly of FIG. 1, showing the spool in first and second spool positions relative to the aperture plate.

With reference to FIG. 2, pressure-regulating valve assembly 10 is shown in a cross-sectional view. Valve assembly 10 includes pressure-balancing member 18 disposed on an end to spool 14 opposite inlet face 30. As illustrated, pressure-balancing member 18 is a spring. As will be appreciated, pressure-balancing member can include any suitable element configured to cooperate with pressure applied to inlet face 30 by fluid such that lip 32 achieves a predetermined axial position along spool movement axis M in response to the fluid pressure.

Spool 14 includes an inlet face 30 with a cupped face 34. Cupped face 34 defines a recess within inlet face 30 and faces inlet 24. The recess formed by cupped face 34 on inlet face 30 of spool 14 provides an angled, e.g. perpendicular surface, relative to direction of fluid flow that deflects particulates (or contaminates) entrained within fluid entering inlet 24. The fluid thereafter conveys the deflected particulates radially and out of the valve thru the outlet 26. In addition, lip 32 defines an acute angle and provides an edge for scraping particulate through outlet 26 as spool 14 translates axially through sleeve 12.

Aperture plate 100 is axially offset from spool 14 and fixed within a first annulus 40 defined within interior surface 22 of sleeve 12. Aperture plate 100 is axially fixed within inlet 24 by a seat member 42. Seat member 42 seats within a second annulus 44 defined within interior surface 22 of sleeve 12 and seats screen 16. A locking ring 46 seats within a third annulus 48 defined within interior surface 22 of sleeve 12 and fixes aperture plate 100, seat member 42, and screen 16 axially along spool movement axis M. This arrangement establishes axial offsets between screen 16, aperture plate 100, and inlet face 30 of spool 14 in the first position.

Figure 3:
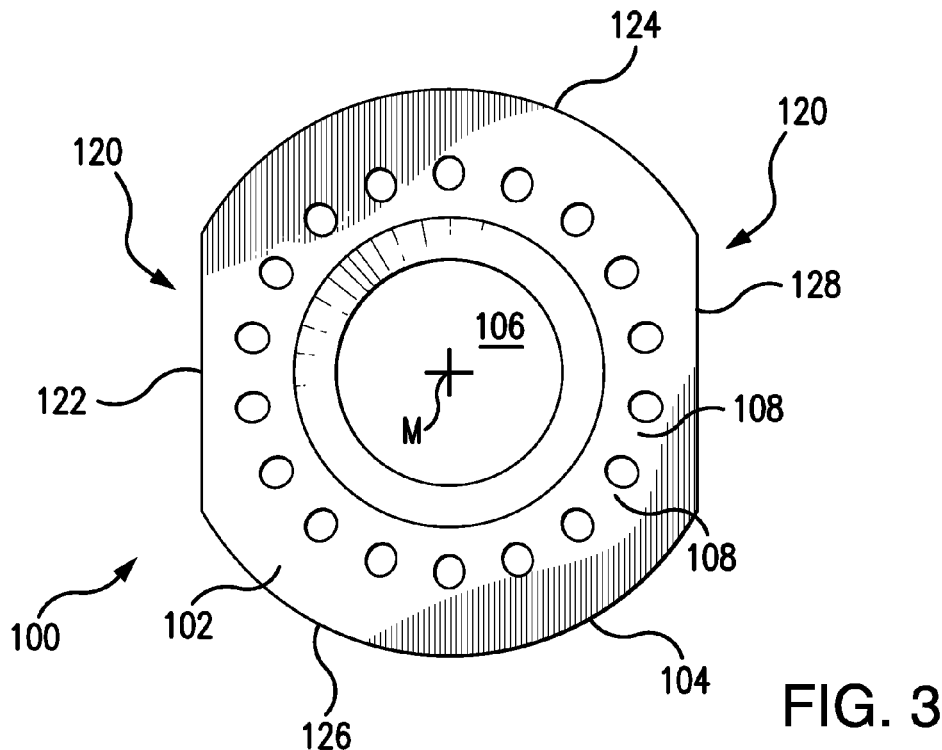
FIG. 3 is a plan view of the aperture plate of the valve of FIG. 1, showing core flow and flow-directing apertures defined by a plate body of the aperture plate.

With reference to FIG. 3, aperture plate 100 is shown. Aperture plate 100 includes a plate body 102. Plate body 102 has a periphery 104 and defines a core flow aperture 106 and a plurality of flow-directing apertures 108. Periphery 104 extends circumferentially about spool movement axis M and is registered to inlet face 30. Core flow aperture 106 extends through a thickness T of aperture plate 100 and is centrally disposed such that spool movement axis M extends through the center of aperture plate 100. Flow-directing apertures 108 extend through the thickness T of aperture plate 100, are radially offset from core flow aperture 106 (and spool movement axis M), and are arranged on a common circumference about movement axis M. In embodiments, flow-directing apertures are arranged symmetrically on a substantially uniform angular pitch. As illustrated, the angular pitch of the plurality of flow-directing apertures 108 is about 18-degrees.

Aperture plate 100 also includes an anti-rotation feature 120 defined by a linear segment 122 of periphery 104. Linear segment 122 extends at least one arcuate segment of periphery 104, and as illustrated is defined between a first arcuate segment 124 and a second arcuate segment 126 of periphery 104. Linear segment 122 seats against a correspondingly contoured segment of a groove defined within spool 14, thereby preventing rotation of aperture plate in response force imparted on aperture plate 100 by swirling fluid. As also illustrated in FIG. 3, a second linear segment 128 defined by periphery 104 spans opposite ends of first arcuate segment 124 and second arcuate segment 126, seats against a segment of a correspondingly contoured groove within spool 14, and provides further resistance against rotational forces. As illustrated, anti-rotation feature 120 includes a second liner segment 128 extending between opposite ends of first arcuate segment 124 and second arcuate segment 126. As will appreciated, aperture plate 100 can include other anti-rotation features such as a key/keyway structures or pin/pinhole structures.

Figure 4:
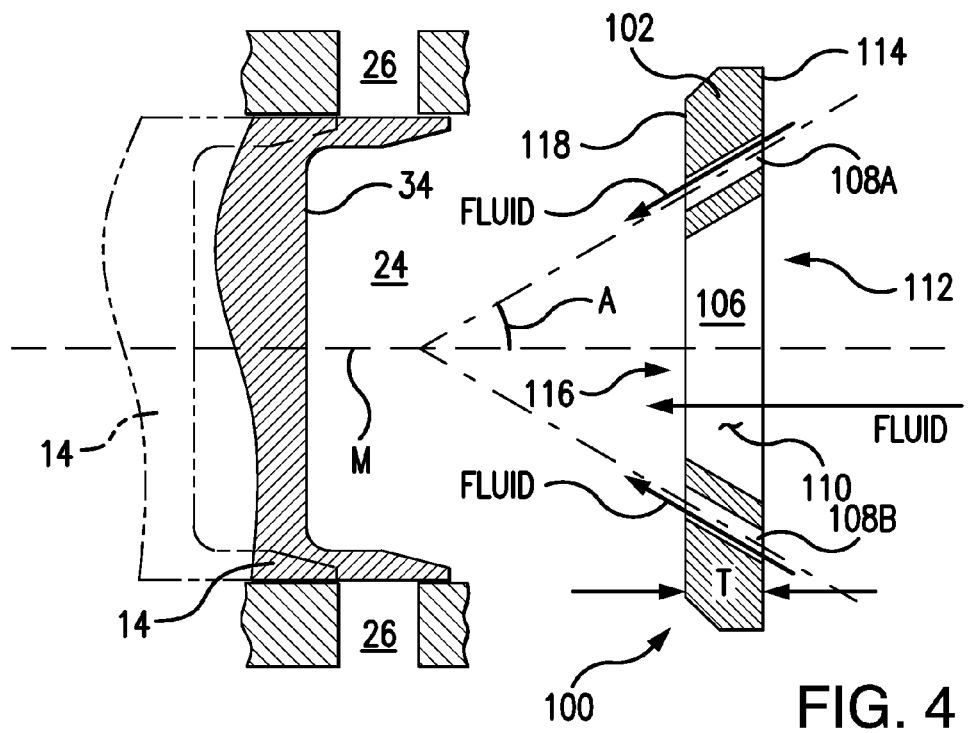
FIG. 4 is a cross-sectional side elevation view of the aperture plate and spool of FIG. 1, showing axes defined by the core flow and flow-directing apertures.

With reference to FIG. 4, aperture plate 100 is shown in a cross-sectional side elevation view. Core flow aperture 106 extends through thickness T of aperture plate 100 and defines a flow area that changes along spool movement axis M and which is greater than an aggregate of the flow areas defined by each of the plurality of flow-directing apertures 108. This allows the majority of the flow traversing aperture plate 100 to path through core flow aperture 106. Core flow aperture 106 tapers between a first flow area 112 defined on a surface 114 opposite inlet face 30 and a second flow area 116 defined on a surface 118 adjacent to inlet face 30.

The tapering of core flow aperture 106 directs fluid traversing core flow aperture 106 inward, straightening (e.g. linearizing) the flow, and reducing (or minimizing) the associated pressure drop across aperture plate 100. As will be appreciated, the obstruction presented by the non-open area of aperture plate 100 contracts the fluid flow area presented to fluid upstream of aperture plate 100. The contraction, as well as the corresponding expansion in the fluid flow area on downstream side of aperture plate 100, reduces the pressure of the fluid flow downstream of aperture plate 100 in relation to upstream of aperture plate 100. Tapering core flow aperture 106 in the direction of fluid flow offsets the pressure loss associated with the expansion and contraction of the fluid, reducing the pressure loss associated with introducing aperture plate 100 immediately upstream of valve 10. The taper may have any angle as suitable for a given application, and the core flow aperture taper shown in FIG. 4 is about 45-degrees for purposes of illustration and not for limitation.

The plurality of flow-directing apertures 108 define a substantially uniform flow area and are angled relative to spool movement axis M. This geometry causes fluid traversing respective flow-directing apertures 108 to form a jet of flow that intersects with the main flow traversing core flow aperture 106, reducing (or minimizing) expansion of the main flow and keeping the flow centered axially along spool movement axis M. Thus, core flow aperture 106 and the plurality of flow-directing apertures 108 cooperate to straighten flow traversing aperture plate 100 and minimize expansion of the flow prior to the flow reaching inlet face 30. As illustrated, a first flow-directing aperture 108A and a second flow-directing aperture 108B define axes angled at a 45-degree angle and lying in the same plane as movement axis M. As further illustrated, the taper angle of core flow aperture is about the same as the angle of the angle of the flow-directing aperture.

Figure 5:
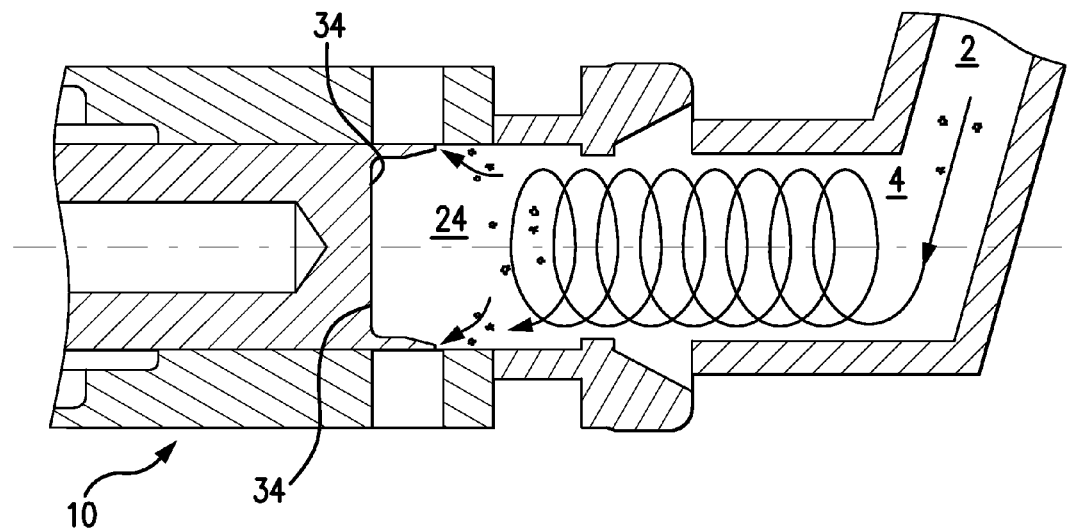
FIG. 5 is cross-sectional side elevation view of the valve of FIG. 1 with the aperture plate removed, showing material entrained in swirling fluid being driven into a spool/sleeve interface.

With reference to FIG. 5, valve 10 is shown with aperture plate 100 removed for purposes of illustrating fluid flow in an exemplary fluid system arrangement. Valve 10 is in fluid communication with a conduit 2 through a coupling interior 4 that is adjacent to inlet 24, and aperture plate 100 has been removed from valve 10 for illustrating flow therethrough. Conduit 2 is angled relative to the spool movement axis of valve 10. Conduit 2 also defines a smaller flow area than a flow area defined within coupling interior 24. This imparts a tangential component to the fluid flow, causing the fluid to swirl about the flow axis as the fluid enters inlet 24 and within inlet 24.

Cupped face 34 generally deflects fluid entering inlet 24. However, under certain conditions such as that illustrated in FIG. 5, swirling fluid entering valve 10 can direct entrained particulate into the interface between spool 14 and sleeve 12. With aperture plate 100, the flow momentum of swirling fluid entering inlet 24 can drive material entrained in the fluid towards the interior circumference of sleeve 12. Driving the entrained material towards the interior circumference of sleeve 12 can force the entrained material between into the spool/sleeve interface, such as the circumferential segments between circumferentially adjacent outlets 26, potentially causing the material to lodge in the interface and change flow rate through valve assembly 10 for a given amount of input fluid pressure.

Figure 6:
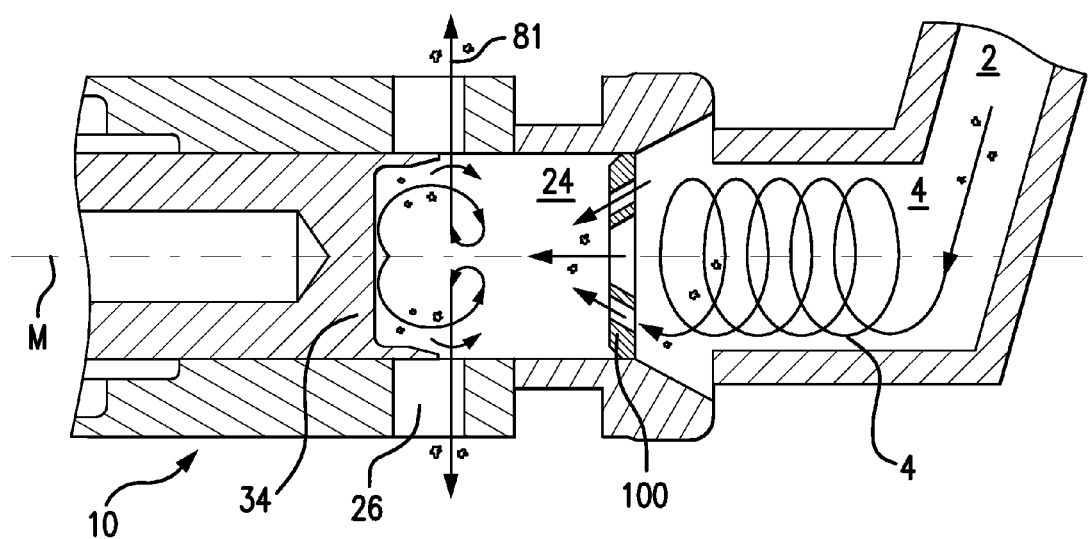
FIG. 6 is cross-sectional side elevation view of the valve shown in FIG. 1 with the aperture plate disposed upstream of the sleeve inlet, showing fluid provided to the valve assembly being centered and straightened in the inlet such that entrained material is swept out of the sleeve outlet.

With reference to FIG. 6, valve 10 is shown with aperture plate installed upstream of inlet 24. Aperture plate 100 straightens and refocuses swirling fluid provided to valve assembly 10 along movement axis M. The straightened and refocused flow recirculates off cupped profile 34 and is pulled out of sleeve 12 by flow exiting through sleeve outlets 26. Since the recirculating flow travels with an axial flow component opposite that illustrated in FIG. 5, the flow does not drive the entrained material in the spool/sleeve interface, and valve assembly 10 is more likely to pass the entrained debris rather than allow the material to accumulate within the sleeve/spool interface.

Entrained particulate (i.e. contaminate or debris) in fluid flows can cause reduce the reliability of certain types of the fluid distribution system components, such as pumps and valves having with pressure driven movable members. Under some conditions, entrained particulate can lodge within valves and resist movement of the movable member, thereby changing response of the valve to input fluid pressure. Valves with close tolerances between the valve housing and valve movable member, such as pressure-regulating valves with matched sleeves and spools, are examples of valves that can experience performance change as a result of contaminate accumulation in the interface between spool and sleeve.

In embodiments of pressure-regulating valves described herein, aperture plate 100 can improve the ability of the valve to pass entrained contaminate instead of accumulate contaminate. In this respect aperture plate 100 can linearize flow by removing tangential flow components as the flow traverses aperture plate 100, thereby rendering the flow amenable to other contamination countermeasures in downstream valve structures. For example, when used in conjunction with spool defining a cupped face, aperture plate 100 can cooperate with the cup to establish straightening (e.g. linearized) of the flow distribution between the face and downstream face of aperture plate 100 to sweep entrained contaminate through outlet of the sleeve. It is to be understood and appreciated that this example of cooperation is exemplary, and that spools and spools having other countermeasures influenced by tangential flow components (i.e. swirl and/or off-center fluid flows) the amount of swirl in input fluid can also benefit from above disclosure.

The methods and systems of the present disclosure, as described above and shown in the drawings, provide for fluid distribution systems properties including improved system reliability. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A valve assembly, comprising:
   a sleeve with an inlet and an outlet and defining a movement axis;
   a spool disposed within the sleeve and movable relative thereto between first and second positions along the movement axis, wherein a flow area defined by the spool between the inlet and the outlet is smaller in the spool first position than in the spool second position; and an aperture plate seated in the inlet and adjacent the spool, wherein the aperture plate defines a core flow aperture and at least one flow-directing aperture to center and straighten flow between the aperture plate and the spool, wherein the inlets of core flow aperture and the at least one flow-directing aperture are defined within a planar inlet face of the aperture plate, wherein a flow area defined by the core flow aperture is greater than a flow area defined by the at least one flow-directing aperture, wherein the at least one flow-directing aperture is angled toward the movement axis and in a taper direction defined by the core flow aperture between an inlet flow area and an outlet flow area of the core flow aperture.

2. A valve assembly as recited in claim 1, wherein the inlet is disposed on an end of the sleeve, wherein the outlet is angled relative to the inlet.

3. A valve assembly as recited in claim 1, wherein a face of the spool adjacent the aperture plate has a cupped profile.

4. A valve assembly as recited in claim 1, wherein the core flow aperture is coaxial with the spool movement axis.

5. A valve assembly as recited in claim 1, wherein the core flow aperture defines a first flow area on a surface opposite the spool and a second flow area adjacent the spool, wherein the first area is larger than the second flow area, wherein the core flow aperture tapers along the movement axis between the first and second flow areas, wherein a taper angle of the core flow aperture is the same as an angle defined between an axis of the at least one flow-directing aperture and the movement axis.

6. A valve assembly as recited in claim 1, wherein a flow area defined by the at least one flow-directing aperture is uniform along a length of the flow-directing aperture.

7. A valve assembly as recited in claim 1, wherein the at least one flow-directing aperture defines an axis that is angled with respect to a spool movement axis defined by the sleeve.

8. A valve assembly as recited in claim 1, wherein the aperture plate defines first and second flow-directing apertures on opposite sides of the core flow aperture.

9. A valve assembly as recited in claim 8, wherein axes defined by the core flow aperture and the flow-directing apertures intersect at a location between aperture plate and spool.

10. A valve assembly as recited in claim 8, wherein axes defined by the core flow aperture and the flow-directing apertures are coplanar with one another.

11. A valve assembly as recited in claim 1, further including a screen seated in the sleeve on a side of the aperture plate opposite the spool.

12. A valve assembly as recited in claim 11, wherein a thickness of the screen is less than a thickness of the aperture plate.

13. A valve assembly recited in claim 1, wherein the aperture plate has a periphery, wherein the aperture plate periphery defines an anti-rotation feature.

14. A valve assembly as recited in claim 13, wherein the anti-rotation feature is a linear segment of the aperture plate periphery.

* * * * *